(12) United States Patent
Bosworth et al.

(10) Patent No.: US 10,996,754 B2
(45) Date of Patent: May 4, 2021

(54) MANUFACTURING MONITORING SYSTEM

(71) Applicant: Aurora Flight Sciences Corporation, Manassas, VA (US)

(72) Inventors: William Robert Bosworth, Somerville, MA (US); Devin Richard Jensen, Cambridge, MA (US); Konstantine Fetfatsidis, Manassas, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 0 days.

(21) Appl. No.: 16/159,246

(22) Filed: Oct. 12, 2018

(65) Prior Publication Data
US 2020/0117271 A1 Apr. 16, 2020

(51) Int. Cl.
| | |
|---|---|
| *G06F 3/01* | (2006.01) |
| *G06T 7/246* | (2017.01) |
| *G06T 7/70* | (2017.01) |
| *A41D 19/00* | (2006.01) |
| *G01L 1/20* | (2006.01) |
| *G01S 17/46* | (2006.01) |
| *H04N 5/33* | (2006.01) |
| *G06F 1/16* | (2006.01) |

(52) U.S. Cl.
CPC ......... *G06F 3/014* (2013.01); *A41D 19/0027* (2013.01); *G01L 1/205* (2013.01); *G01S 17/46* (2013.01); *G06T 7/246* (2017.01); *G06T 7/70* (2017.01); *H04N 5/33* (2013.01); *G06F 1/163* (2013.01); *G06T 2207/10016* (2013.01); *G06T 2207/30196* (2013.01)

(58) Field of Classification Search
CPC ......... G06F 3/014; G06F 1/163; G06T 7/246; G06T 7/70; G06T 2207/10016; G06T 2207/30196; A41D 19/0027; G01L 1/205; H04N 5/33; G01S 17/46
USPC .......................................................... 73/774
See application file for complete search history.

(56) References Cited

U.S. PATENT DOCUMENTS

| | | |
|---|---|---|
| 5,143,505 A | 9/1992 | Burdea et al. |
| 6,128,004 A | 10/2000 | McDowall et al. |
| 6,452,584 B1 | 9/2002 | Walker et al. |

(Continued)

FOREIGN PATENT DOCUMENTS

| | | |
|---|---|---|
| EP | 2 069 876 B1 | 10/2013 |
| WO | 2008/013648 A2 | 1/2008 |

OTHER PUBLICATIONS

Flock of Birds brochure, copyright 2000 Ascension Technology Corporation.

(Continued)

*Primary Examiner* — Octavia Hollington
(74) *Attorney, Agent, or Firm* — Michael Stanley Tomsa; McAndrews, Held & Malloy, Ltd.; Eugene H. Nahm

(57) ABSTRACT

A manufacturing monitoring system is disclosed. The manufacturing monitoring system comprises a manufacturing workspace. Technicians wearing force sensor and/or motion capture marker equipped gloves may work within the manufacturing workspace. Motion capture cameras may ring the manufacturing workspace. Motion data from the cameras and/or force data from the gloves may be sent to a remote workstation where they may be processed and analyzed. The workstation may produce quality assessment and/or training outputs based on the motion and/or force data.

20 Claims, 6 Drawing Sheets

(56) References Cited

U.S. PATENT DOCUMENTS

| | | | |
|---|---|---|---|
| 6,701,296 B1 | 3/2004 | Kramer et al. | |
| 6,771,294 B1* | 8/2004 | Pulli | G06F 3/017 715/863 |
| 9,120,014 B2* | 9/2015 | Mohn | A63B 24/0006 |
| 9,510,628 B2* | 12/2016 | Ragan | A41D 19/0006 |
| 9,610,476 B1* | 4/2017 | Tran | A63B 69/38 |
| 2001/0040550 A1 | 11/2001 | Vance et al. | |
| 2002/0011934 A1 | 1/2002 | Cacioli et al. | |
| 2002/0075232 A1 | 6/2002 | Daum et al. | |
| 2005/0099503 A1* | 5/2005 | Kitabayashi | G06F 3/014 348/211.99 |
| 2012/0025945 A1 | 2/2012 | Yazadi et al. | |
| 2012/0227158 A1 | 9/2012 | Ashworth et al. | |
| 2013/0271602 A1* | 10/2013 | Bentley | G06K 9/00342 348/143 |
| 2016/0038088 A1* | 2/2016 | Lari | A61B 5/6807 600/595 |
| 2016/0161301 A1* | 6/2016 | Guenther | G07C 1/00 702/150 |
| 2016/0256082 A1* | 9/2016 | Ely | A61B 5/0024 |
| 2016/0259408 A1* | 9/2016 | Messingher | G06F 3/0346 |
| 2016/0259417 A1* | 9/2016 | Gu | G06F 3/016 |
| 2017/0055606 A1* | 3/2017 | Xu | H04B 1/385 |
| 2017/0086519 A1* | 3/2017 | Vigano' | A61B 5/225 |
| 2017/0100632 A1* | 4/2017 | Castelo Branco | A41D 19/0027 |
| 2017/0249561 A1* | 8/2017 | Abdallah | G06N 3/008 |
| 2018/0247255 A1 | 8/2018 | Jones et al. | |
| 2019/0311648 A1* | 10/2019 | Alshami | G09B 5/04 |
| 2019/0357811 A1* | 11/2019 | Di Pardo | G06F 21/32 |

OTHER PUBLICATIONS

Kostas N. Tarchanidis, "Data Glove with a Force Sensor," IEEE Transactions on Instrumentation and Mesurement, vol. 52, No. 3, Jun. 2003.

Liezel Labios, "Sensor-filled glove could help doctors take guesswork out of physical exams," Apr. 21, 2017, Science X network.

The extended European search report for application No. 19202814.0, dated Feb. 21, 2020.

The examination report for application No. 19202814.0, dated Mar. 11, 2021 (7 pages).

* cited by examiner

MANUFACTURING MONITORING SYSTEM

TECHNICAL FIELD

The present disclosure relates to a manufacturing monitoring system, and more particularly to a system for monitoring manufacturing technicians using sensor and motion capture marker equipped gloves.

BACKGROUND

Composite manufacturing is a method of creating complex geometric shapes with high rigidity and low weight. Composite structures, such as those used in aircraft structures, can be fabricated using sheets of composite material, also known as layers or plies. Multiple composite material sheets may be assembled to form a composite laminate or other composite structure using a bonding material, such as resin or epoxy. The method is increasingly common in aerospace, high performance cars, and sports equipment. Aerospace has historically been a leading-edge user/developer of composite manufacturing.

Composite structures are widely used in aircraft fabrication because they are generally lighter, more durable, and longer lasting when compared to aircraft structures fabricated from traditional aircraft materials (e.g., aluminum, aluminum alloys, etc.). Indeed, weight reduction is major advantage of composite material usage and is a key factor in using it in an aircraft structure. For example, fiber-reinforced matrix systems are stronger than traditional aluminum found on most aircraft, while also providing smooth surfaces and increased fuel efficiency (e.g., due to lower weight and reduced drag). Fiberglass, for example, is a common composite material used in composite structures for aircraft applications. In addition to weight saving benefits, composite materials do not corrode as easily as other types of structures. Further, composite structures do not crack from metal fatigue and they hold up well in structural flexing environments. Finally, composite materials are particularly useful when fabricating complex 3-dimensional ("3D") structures, which typically offer a favorable strength-to-weight ratio compared to conventional metal or plastics manufacturing. Accordingly, in addition to lower weight, composite structures result in reduced maintenance and repair costs, while also enabling the fabrication of complex shapes.

However, composite manufacturing may be more expensive compared to some other conventional metal manufacturing methods. This added cost can be attributed, at least in part, to the relatively complex and time-consuming manufacturing process, which may require multiple steps manually performed by a human technician.

SUMMARY

The present disclosure relates to a manufacturing monitoring system, and more particularly to a system for monitoring composite manufacturing technicians using sensor and motion capture marker equipped gloves.

According to a first aspect, a system for monitoring a user during a process comprises: a glove that is sized and shaped to be worn on a hand of a user during the process; a force sensor coupled to the glove and configured to measure a force imparted on the glove during the process; a motion capture marker coupled to the glove and configured to provide a beacon for a motion capture camera to track during the process; and a remote workstation operatively coupled with the force sensor and the motion capture camera, wherein the remote workstation is configured to track, via the motion capture camera, a motion of the user during the process, process, via a processor, force data from the force sensor and motion data from the motion capture cameras, and performing an analysis of the force data and position data and generate an output based on the analysis.

In certain aspects, the force sensor is a force sensitive resistor.

In certain aspects, the force sensor is positioned at a fingertip of the glove.

In certain aspects, the force sensor comprises a plurality of force sensors, each of said plurality of force sensors positioned at a different fingertip of the glove.

In certain aspects, the motion capture marker comprises a passive motion capture marker.

In certain aspects, the motion capture marker comprises an active motion capture marker.

In certain aspects, the motion capture marker is an infrared (IR) motion capture marker.

In certain aspects, the motion capture marker comprises a plurality of motion capture markers positioned proximate knuckle portions of the glove.

In certain aspects, the force sensor is in communication with corollary equipment.

In certain aspects, the corollary equipment comprises a controller, a transceiver, and a power source.

In certain aspects, the corollary equipment is attached to the glove.

In certain aspects, the transceiver is configured to send data representative of the force measured by the force sensor to the remote workstation.

In certain aspects, the motion capture marker is in electrical communication with corollary equipment.

In certain aspects, the corollary equipment comprises a controller, a transceiver, and a power source.

In certain aspects, the corollary equipment is attached to the glove.

According to a second aspect, a method for monitoring a technician during a process via a glove equipped with a plurality of force sensors and a plurality of motion capture markers comprises: measuring, via the plurality of force sensors, a force imparted upon the gloves during the process; tracking, via one or more motion capture cameras, a motion of the technician during the process, wherein the one or more motion capture cameras are configured to track the motion via the plurality of motion capture markers positioned on the gloves; transmitting force data measured by the plurality of force sensors and motion data tracked by the motion capture cameras to a workstation; processing, via a processor, the force data and motion data; storing the force data and motion data in a database; performing an analysis of the data; and providing output based on the analysis.

In certain aspects, the processing comprises generating a model based on the force data and motion data and storing the model in the database.

In certain aspects, the analysis comprises assessing composite layup manufacturing quality based at least in part on prior force data and motion data stored in the database.

In certain aspects, the analysis comprises assessing composite layup manufacturing quality based at least in part on prior models stored in the database.

In certain aspects, the output comprises training information to train a robot to automate one or more portions of the composite layup manufacturing.

In certain aspects, the training information is used to train a human operator to perform one or more portions of the composite layup manufacturing.

According to a third aspect, a system for monitoring a technician during a process comprises: a glove having a force sensor configured to measure a force on the glove during composite manufacturing and a motion capture marker configured to provide a beacon for a first camera to track during composite manufacturing; a first camera configured to track a position or a change in position of the glove as a function of a position or change in position of the motion capture marker; a transmitter configured to transmit force data, wherein the force data is representative of the force measured by the force sensor; a receiver configured to receive the force data; a database configured to store force data representative of the force measured by the force sensor and position data representative of the position or change in position tracked by the camera; and an analytics engine configured to perform an analysis of the force data and position data and generate an output based on the analysis.

In certain aspects, the force sensor is one of a plurality of force sensors, and wherein each of the plurality of force sensors is positioned at a fingertip of the glove.

In certain aspects, the motion capture marker comprises a plurality of motion capture markers, wherein each motion capture marker is an IR motion capture marker.

In certain aspects, the motion capture markers are positioned proximate knuckle portions of the glove.

In certain aspects, the first camera is directed at a composite manufacturing workspace, wherein the first camera is configured to track a position of the motion capture marker in the composite manufacturing workspace.

In certain aspects, the system comprises a plurality of cameras directed at the composite layup manufacturing workspace, each configured to track the position or the change in position of the glove as a function of the position or change in position of the motion capture marker.

In certain aspects, the system includes multiple cameras configured to track a position of the technician in a composite manufacturing workspace using computer vision methods.

In certain aspects, the output of the analytics engine comprises an assessment of quality of a composite work resulting from the process.

In certain aspects, the output of the analytics engine comprises training information.

DESCRIPTION OF THE DRAWINGS

The foregoing and other objects, features, and advantages of the devices, systems, and methods described herein will be readily understood from the following description of particular embodiments thereof, as illustrated in the accompanying figures, where like reference numbers refer to like structures. The figures are not necessarily to scale, emphasis instead being placed upon illustrating the principles of the devices, systems, and methods described herein.

DETAILED DESCRIPTION

Figure 1:
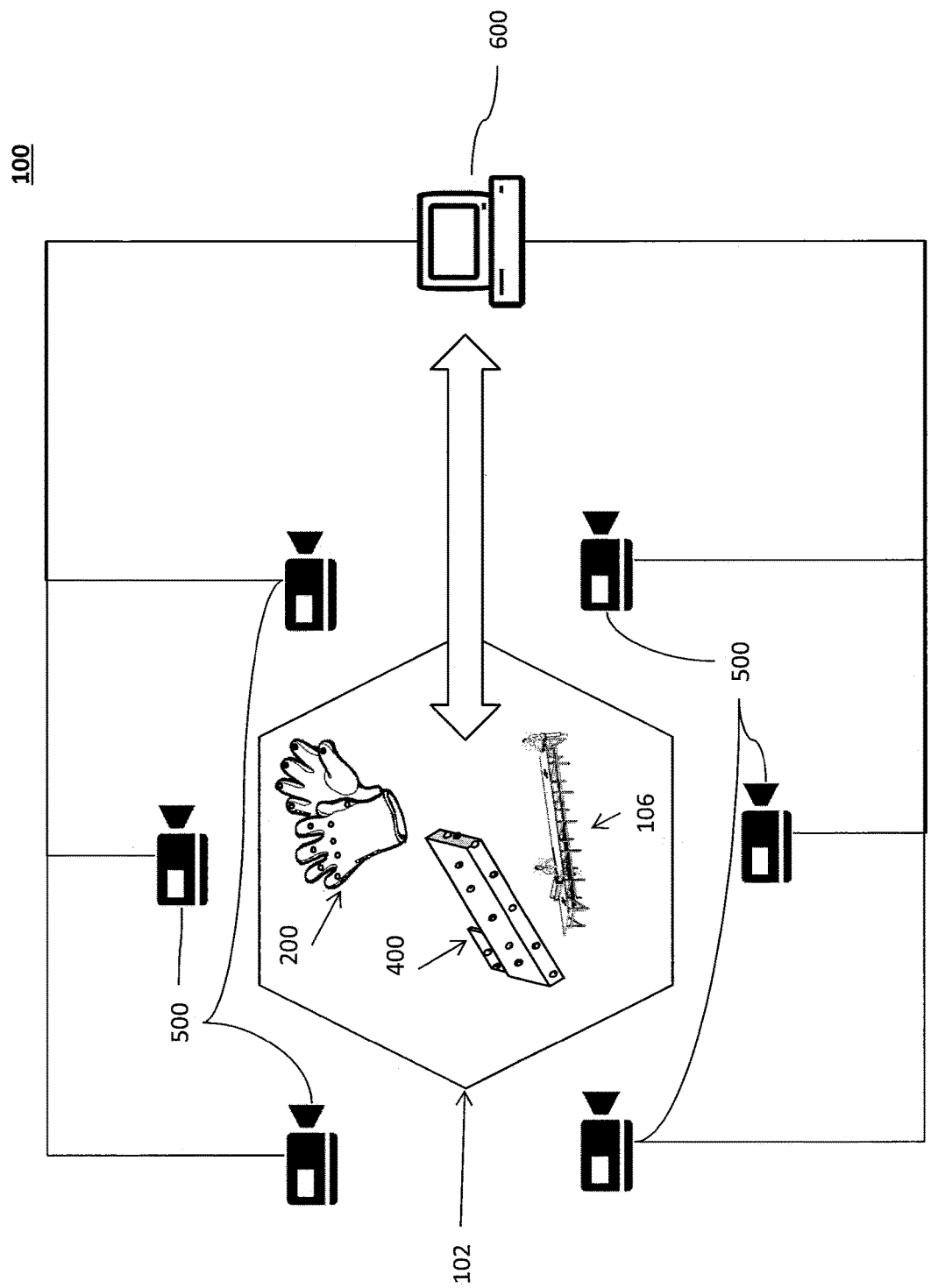
FIG. 1 shows a diagram illustrating an example manufacturing monitoring system according to an aspect of the present disclosure.

Preferred embodiments of the present disclosure will be described herein below with reference to the accompanying drawings. The components in the drawings are not necessarily drawn to scale, the emphasis instead being placed upon clearly illustrating the principles of the present embodiments. For instance, the size of an element may be exaggerated for clarity and convenience of description. Moreover, wherever possible, the same or similar reference numbers are used throughout the drawings to refer to the same or like elements of an embodiment. In the following description, well-known functions or constructions are not described in detail because they may obscure the disclosure in unnecessary detail. Further, it is understood that terms such as "first," "second," "top," "bottom," "upper," "under," "lower," "side," "front," "back," and the like, are words of convenience and are not to be construed as limiting terms. No language in the specification should be construed as indicating any unclaimed element as essential to the practice of the embodiments. For this application, the following terms and definitions shall apply:

The term "and/or" means any one or more of the items in the list joined by "and/or." As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z".

The terms "communicate" and "communicating" refer to (1) transmitting, or otherwise conveying, data from a source to a destination, and/or (2) delivering data to a communications medium, system, channel, network, device, wire, cable, fiber, circuit, and/or link to be conveyed to a destination.

The term "data" as used herein means any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms.

The terms "about" and "approximately," when used to modify or describe a value (or range of values), position, orientation, and/or action, mean reasonably close to that value, range of values, position, orientation, and/or action. Thus, the embodiments described herein are not limited to only the recited values, ranges of values, positions, orientations, and/or actions but rather should include reasonably workable deviations.

The terms "coupled," "coupled to," and "coupled with" as used herein, each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect," means to attach, affix, couple, join, fasten, link, and/or otherwise secure. As used herein, the term "anchor" means to attach, affix, connect, couple, join, fasten, link, and/or otherwise secure.

The term "operatively coupled" means that a number of elements or assemblies are coupled together, such that as a first element/assembly moves from one state (and/or configuration, orientation, position etc.) to another, a second element/assembly that is operatively coupled to the first element/assembly also moves between one state (and/or configuration, orientation, position etc.) to another. It is noted that a first element may be "operatively coupled" to a second element without the opposite being true.

The term "processor" means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with a memory device.

The term "exemplary" means serving as a non-limiting example, instance, or illustration. As utilized herein, the terms "e.g.," and "for example" set off lists of one or more non-limiting examples, instances, or illustrations.

The term "data" as used herein means any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms.

The term "database" as used herein means an organized body of related data, regardless of the manner in which the data or the organized body thereof is represented. For example, the organized body of related data may be in the form of one or more of a table, map, grid, packet, datagram, frame, file, email, message, document, report, list, or in any other form.

The term "memory" means computer hardware or circuitry to store information for use by a processor and/or other digital device. The memory can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

Disclosed herein is an example of a manufacturing monitoring system, and more particularly a system for monitoring manufacturing technicians using sensor and/or motion capture marker equipped gloves in a manufacturing workspace. The manufacturing may be composite manufacturing and/or other types of manufacturing. The manufacturing monitoring system may help assess and/or improve the quality and/or repeatability of the manufacturing process.

Composite manufacturing is an important process for building high performance aerostructures, but it is a complex and relatively expensive endeavor compared to many common plastics and metals manufacturing. The cost of composite manufacturing may be due to material cost, labor costs, time and energy-intensive curing, and/or expensive tooling/molds.

While automation may sometimes be used in composite manufacturing, many of the most complex pieces use manual layup by skilled technicians. Much of the human labor in composite manufacturing is introduced during layup. As with any human endeavor, even highly trained technicians can introduce variability from part to part and from technician to technician. Ideally, any manufacturing defects that may be introduced by human variability should be caught early, before committing a defective part to additional processes downstream. The present disclosure is directed towards capturing manipulations performed by the technicians in order to improve process and/or quality control for the composite manufacturing, aid in teaching/assessment of technicians, and/or aid in teaching automated (e.g., robotic) systems how to perform the required composite manufacturing process. Better measurement of the layup process may enable a process monitor to identify when human variability has resulted in intolerable manipulation that should not proceed to additional manufacturing steps. Additionally, measuring the layup process may aid in teaching new technicians, assessing performance of technicians, and teaching robots to perform these manipulations.

The proposed disclosure describes a set of gloves which a technician may wear which may capture the complex forces and motions performed by the technician during layup. Manipulation may consist of both force and motion, and accurate measurement of manipulation may address both facets. This disclosure presents methods for tracking both force and motion exerted by the technician onto the layup process. The proposed disclosure may be useful for constant monitoring of manufacturing processes. Composite layup manufacturing remains as much an "art" as a "science" and process measurement is relatively uncommon. Better process measurement may be helpful in identifying possible efficiencies, and particularly to understand how to inject autonomy into the manufacturing process.

This disclosure introduces a system to measure the forces and motions exerted by a technician while they are performing a composite layup operation, though the disclosed system and/or methods may also be used in other manufacturing operations. In some examples, the gloves may measure contact forces between a glove (and/or technician and/or hand wearing the glove) and a tool, workpiece, mold, workbench, table, and/or other object in a workspace, as well as a position and/or motion of the glove relative to the tool, workpiece, mold, workbench, table, and/or other object in the workspace. This force and motion information may be used to measure the performance of technicians, which may be tracked through to final acceptance tests of the completed composite parts. These measurements may identify manipulations that are done correctly and/or incorrectly in nearly real-time, which may save significant resources. Additionally, once a baseline for "good" manipulation is defined, the information may be useful to teaching new technicians or to teach robots how to perform the manipulations. The glove may be minimally disruptive to the composite manufacturing and/or layup process as technicians traditionally already wear gloves during this process to minimize transfer of chemicals between human and composite pieces.

This disclosure describes a method of measuring the manipulations performed by highly skilled technicians during the manual layup process of composite manufacturing, which may be used to create a log of "best practices" for manipulation, and/or monitor the performance of the manipulation tasks. The disclosed layup-measurement system may be used as a constant monitoring process in order to monitor and/or verify technician performance. This can be used to aid the technician and/or to record manipulation data that may be reviewed for potential issues if and/or when a part fails final inspection. The system may also be used to help teach new technicians and/or teach automated systems how to perform similar layup activities—i.e., to create a specification for robotic layup of traditional manual layup.

The disclosure relates to a force-and-motion sensing glove to measure the forces and/or motions of a human technician (and in particular, the gloved hands of a human technician) during layup. The glove may comprise of pressure/force sensors embedded into and/or attached onto the fingertips and/or edges of the glove, as well as motion-capture markers, such as infra-red (IR) motion capture markers, for example. The glove may include a controller to coordinate data acquisition, as well as wireless data transmission capabilities (e.g., via a transceiver or other communication device) to transmit the data to a remote workstation. The glove may also contain a power source, such as a battery, for example. In some examples, the power source, controller, and/or communication device may be placed somewhere else on the body of the technician (e.g., a tool-belt, a backpack, a hat or helmet, a vest, a sleeve, an armband or wristband, and/or some other wearable and/or attachable accessory). In some examples, force sensors may additionally, or alternatively, be embedded into the composite mold itself.

In addition to the glove, the system may comprise a composite layup process that operates inside of an IR-motion capture environment. One or more composite molds may also be equipped with IR motion sensing markers. In some examples, the one or more molds may be equipped with force sensors as well. The data acquired by the system may be incorporated into a model of the composite part and/or layup process itself. For motion sensing, IR motion capture is suggested because its relative ease of use and global reference. Internal joint measurements—i.e., those angle measurements measured using joint encoders or other sensors (e.g., potentiometers, goniometers, stretch sensors, placing/tracking IR markers relative to each other, etc.)—could also be used. In some examples, conventional computer vision sensing may be used to augment the 3D IR-motion capture system.

The force-motion glove may be used to acquire manipulation data pertaining to the layup process. The data may be saved in a database of the remote workstation. The data base may be used to create a statistical description of the types of manipulations performed by a technician onto a part. The database of manipulations can be used to correlate manipulations to ultimate part quality, as assessed during quality checks downstream of the layup process (up to and including final inspection). Data from the system may also be stored to a database of historic quality data. The database may then be referenced by the system (or another system) and used to investigate the potential causes or sources of defects found in later inspection steps. For example, historic quality data of the composite material sheets may be compared to a later-discovered defect in order to identify any correlations between the qualities of the composite material sheet and the later-discovered defect. In certain aspects, for example, the historic quality data may be used to generate a look up table that can be used to identify potentially defective composite material sheets. In other aspects, machine-learning techniques may be used to detect and/or predict potentially defective composite material sheets. Once the database is verified as accurate, the measurements taken during layup can be used to aid the technician by suggesting that manipulations were not performed correctly. This information can also be used to train new technicians and also to define the required motions needed to program a robot to perform the layup.

The IR markers may be energetically passive and/or made of hard plastic. The pressure sensors and wiring should be mounted in a way to maintain structural stability in the manufacturing environment. The sensors may be sealed so that they are relatively impervious to damage from the composite manufacturing environment. Any battery or other control circuitry may be mounted in relatively sealed and/or isolated enclosures, such that they may be removable from the physical glove so that the glove can be cleaned as needed.

FIG. 1 shows a diagram illustrating an example manufacturing monitoring system 100 according to an aspect of the present disclosure. The manufacturing monitoring system 100 comprises a manufacturing workspace 102 within which technicians 104 may operate. In some examples, the technicians 104 may wear one or more gloves 200 equipped with one or more sensors 202 and/or one or more motion capture markers 204. In some examples, the technicians 104 may use one or more workbenches 106 within the workspace 102. In some examples, the technicians 104 may use one or more molds 400 equipped with sensors 202 and/or motion capture markers 204 within the workspace 102. In some examples, cameras 500 may be directed toward the workspace 102. The cameras 500 may be operatively coupled to a remote workstation 600. The remote workstation 600 may be configured to receive position and/or motion data from the cameras 500 and/or force data from the sensors 202 of the gloves 200 and/or molds 400 within the workspace 102.

Figure 2:
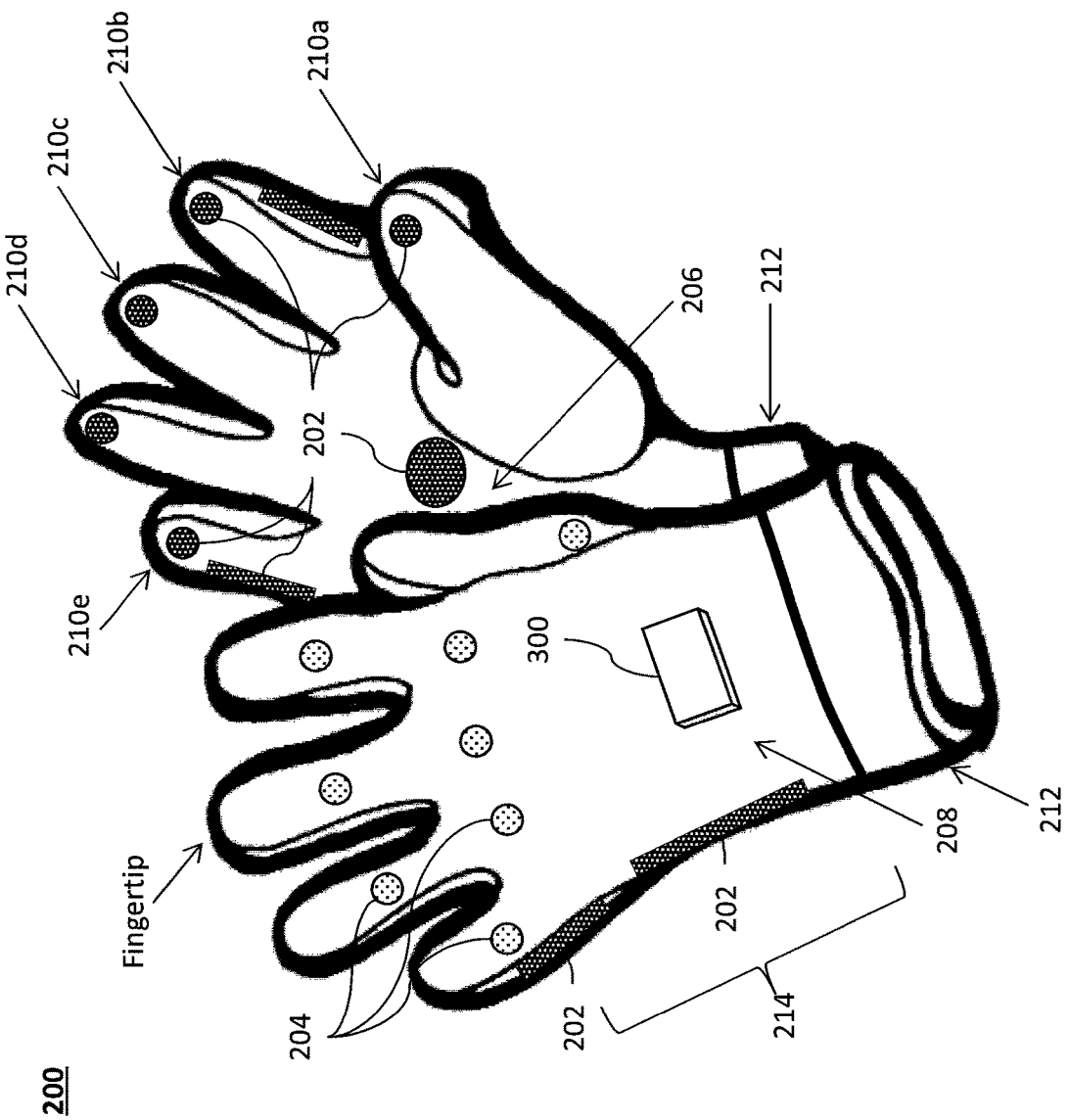
FIG. 2 shows a perspective view of an example pair of sensor and motion capture marker equipped gloves according to an aspect of the present disclosure.

FIG. 2 illustrates an example of gloves 200 that may be used in accordance with an aspect of the disclosure. One or more gloves 200 may be used and/or worn by a technician 104 during composite manufacturing, and/or other types of manufacturing. In particular, the gloves 200 may be used and/or worn by a technician 104 during a manual hand layup portion of the composite manufacturing process. In some examples, the gloves 200 may help to minimize transfer of chemicals and/or other substances between human skin and the materials used in the composite manufacturing, similar to conventional gloves worn by technicians 104 during a manual hand layup portion of the composite manufacturing process.

Each gloves 200 may generally comprise a plurality of finger portions (e.g., sleeves sized and shaped to receive and conform to human fingers), a main glove body 214 formed by a front side 206 (e.g., a palm panel) and a back side 208 (e.g., a back panel), and a cuff portion 212. Each of the plurality of finger portions may be attached to the main glove body 214 at a proximal end, where the distal end of each of the plurality of finger portions is closed to define a finger-tip portion. The plurality of finger portions may comprise a thumb portion 210*a*, index finger portion 210*b*, a middle finger portion 210*c*, ring finger portion 210*d*, and a pinky finger portion 210*e*.

The gloves 200 may be fabricated from fabric that is knitted or sewn. The fabric may comprise, for example, glass fibers, filaments, ultra-high molecular weight polyethylene, nylons, NOMEX®, TWARON®, KEVLAR®, DYNEEMA®, SPECTRA®, VECTRAN®, SPANDEX®, and the like or any blend of the fibers and materials. In certain aspects, the gloves 200 may be heat resistant to the wearer. For example, each glove 200 may comprise a heat-resistant liner.

The gloves 200 may further include sensors 202. In some examples, some or all of the sensors 202 may be force sensors configured to measure and/or detect one or more physical and/or mechanical forces imparted upon the gloves 200 during the composite manufacturing process. In some examples, some or all of the sensors 202 may be pressure sensors configured to measure and/or detect one or more physical and/or mechanical pressures upon the gloves 200 during the composite manufacturing process. For example, sensors 202 (e.g., pressure sensors) may be embedded into the glove material (e.g., rubber). In some examples, some or all of the sensors 202 may be force sensitive resistors configured to have a variable resistance that changes when a force and/or pressure is applied, such that the force and/or pressure upon the gloves 200 may be measured and/or detected based on the resistance and/or change in resistance.

In some examples, the sensors 202 may be positioned in and/or on finger-tips of the gloves 200 and/or along the side edges of the gloves 200. For example, some sensors 202 may be positioned in and/or on a front side 206 of the gloves 200, near ends of the finger portions of the gloves 200. In some examples, some sensors 202 may be positioned in and/or on front side 206 portions of the gloves 200, closer to middle regions of the finger portions of the gloves 200. In some examples, the sensors 202 may also be positioned along the edges of the gloves 200 between the index finger and thumb. In some examples, sensors 202 may be positioned along the side edges of the gloves 200 proximate the pinky finger. In some examples, the sensors 202 on the side edges may span the front side 206 and back side 208 edges of the gloves 200. In some examples, sensors may also be positioned proximate palm portions of the gloves 200. This placement may ensure that the sensors 202 detect forces imparted upon the gloves 200 due to finger manipulation of objects (which will typically include finger-tip manipulation), as well as other object manipulation that may involve the edges and/or palm portions (e.g., grasping, pushing, pulling, flattening, etc.). In other aspects, sensors may be embedded at one or more of the knuckles of the glove 200, for example. In some examples, some or all of the sensors 202 may be embedded within the material of the gloves 200. In some examples, some or all of the sensors 202 may be attached to an interior or exterior surface of the gloves 200, such as with adhesive, hook and loop fasteners, sewing, and/or other suitable attachment methods.

In some examples, the gloves 200 may include motion capture markers 204 configured to facilitate position and/or motion capture by motion capture cameras 500. In some examples, the markers 204 may be IR markers 204, configured to facilitate position and/or motion capture by IR motion capture cameras. The markers 204 may be passive and/or active markers. For example, some or all of the markers 204 may be passive markers comprised of a reflective material that may be detected by motion capture cameras 500. In such examples, no electric power would be needed to provide energy to the markers 204. In some examples, some or all of the markers 204 may be active markers, such as, for example, light emitting diodes (LEDs) and/or other powered devices. In such examples, the markers 204 may be powered by an electrical power source 302. In some examples, some or all of the markers 204 may be hybrid (i.e., active-passive) markers 204, such as, for example, moving and/or otherwise variable reflective material. The markers 204 may provide a beacon for cameras 500 to track during motion capture.

The markers 204 may be positioned in and/or on the gloves 200 such that they may be seen by motion capturing cameras 500 directed at technicians 104 in a workspace 102. In some examples, some or all of the markers 204 may be positioned in and/or on a back side 208 of the gloves 200. In some examples, markers 204 may be positioned on some or all of the fingers of the gloves 200. In some examples, markers 204 may be positioned on the back side 208 of the palms of the gloves 200. In some examples, markers 204 may be positioned proximate joint and/or knuckle portions of the gloves 200. The gloves 200 may further comprise other sensors, such as an inertial measurement unit (IMU) (e.g., a 9-axis IMU) to measure angular orientation. In another aspect, the global position may be determined using pulsed magnetic field tracking techniques. A pulsed magnetic field tracking technique can train position and orientation without restrictions, thereby eliminated the need for a clear line-of sight between sensors and transmitter. Further, pulsed magnetic field tracking techniques can simultaneous track multiple sensors without degradation in measurement rates.

Figure 3:
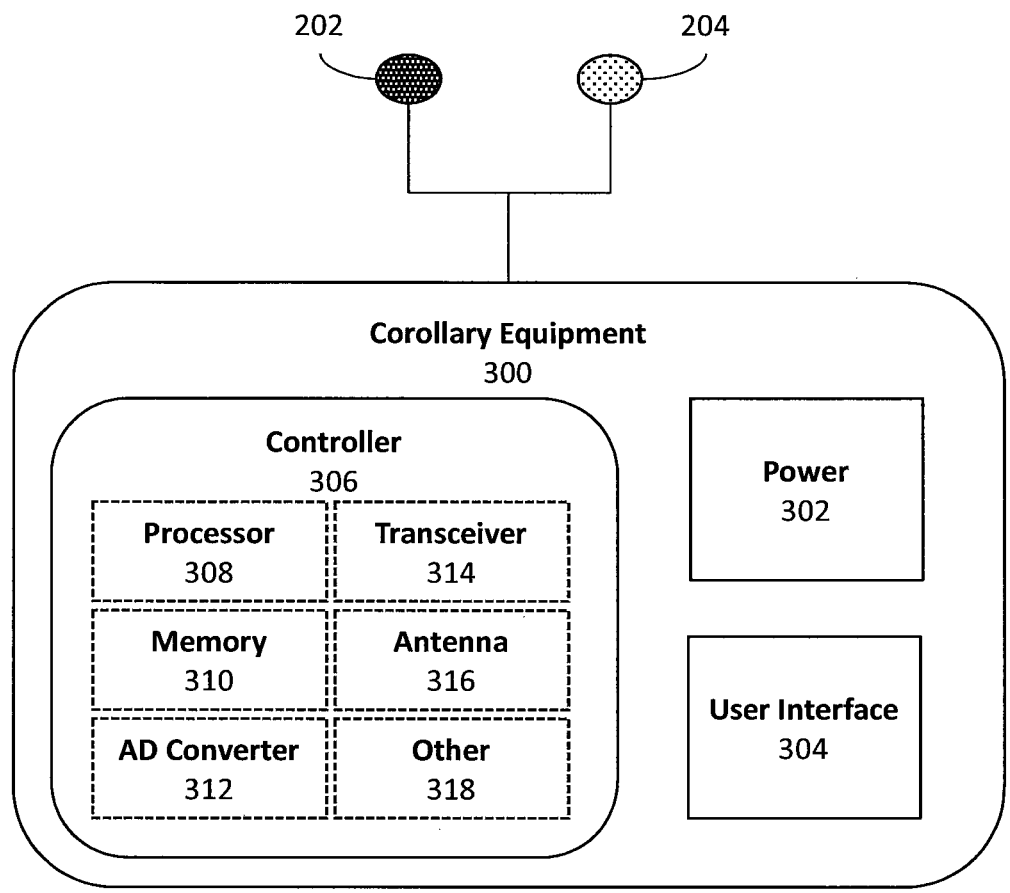
FIG. 3 shows a block diagram illustrating example functional connection s of a sensor and motion capture marker to corollary equipment according to an aspect of the present disclosure.

In some examples, the sensors 202 and/or markers 204 of the gloves 200 may be in electrical communication with corollary equipment 300, such as through one or more lines, cords, cables, wires, etc. FIG. 3 illustrates the connection of the sensors 202 and/or markers 204 to the corollary equipment 300. In some examples, some or all of the corollary equipment 300 may be mounted in one or more relatively sealed and/or isolated enclosures. In some examples, some or all of the corollary equipment 300 may be removably attached to the gloves 200, such that they may be removed from the gloves 200 for cleaning, for example. In some examples, some or all of the corollary equipment 300 may be placed in an accessory that may be worn and/or attached to a technician (e.g., a tool-belt, a backpack, a hat or helmet, a vest, a sleeve, an armband or wristband, and/or some other wearable and/or attachable accessory).

In some examples, the corollary equipment 300 may include a controller 306 and/or a power source 302 (e.g., a battery), such as shown, for example, in FIG. 3. In some examples, the corollary equipment 300 may also include user interface (UI) equipment 304, such as a display, a touch screen interface, a physical keyboard, and/or one or more input/output connections configured to interface with external devices (e.g., hard drive, flash memory, or the like). In some examples, the UI 304 may include feedback devices, such as haptic devices, display devices, and/or audio devices. In some examples, the sensors 202 and/or markers 204 may be (entirely or partly) powered and/or controlled by the corollary equipment 300. In some examples, data (e.g., force, pressure, and/or resistance measurements) from the sensors 202 may be communicated to the controller 306 for processing and/or transmission to a remote workstation 600.

In some examples, such as shown in FIG. 3, the controller 306 may comprise a processor 308, a memory 310, an analog-to-digital converter 312, a transceiver 314, an antenna 316, and, where desired, other systems 318. In some examples, the processor 308 may be operatively coupled to, and/or integrated with, the memory 310. The processor 308 may be configured to perform one or more operations based at least in part on instructions (e.g., software) stored in memory and/or received via the transceiver 314 and/or external devices. In some examples, the analog to digital converter 312 may be configured to translate information received from the sensors 202 (analog) into a (digital) form fit for processing by the processor 308. In some examples, the sensors 202 may be configured to communicate data to the controller that is already in a form fit for processing by the processor 308. In some examples, the controller 306 may transmit analog data from the sensors 202 via the transceiver 314 without the data being converted by the converter 312.

The controller 306 may include a wireless transceiver 314 coupled with an antenna 316 to communicate data. For example, the wireless transceiver 314 may communicate with a remote workstation 600 over a network and/or wireless channel to send and/or receive data pertaining to the sensors 202, markers 204, and/or corollary equipment 300. In certain aspects, the wireless transceiver 314 may be configured to communicate using one or more wireless standards such as Bluetooth (e.g., short-wavelength, Ultra-High Frequency (UHF) radio waves in the Industrial, Scientific, and Medical (ISM) band from 2.4 to 2.485 GHz), near-field communication (NFC), Wi-Fi (e.g., Institute of Electrical and Electronics Engineers' (IEEE) 802.11 standards), etc. The remote workstation 600 may facilitate monitoring and/or control of the sensors 202, markers 204, and/or corollary equipment 300.

The controller 306 may further include other desired services and/or systems 318. For example, the controller 306 may be provided with internally integrated or an external transmitting transducer excitation mechanism, such as a pulser, and a receiving transducer amplification mechanism, such as a receiver amplifier. In some examples, the other systems 318 may comprise systems relating to the feedback mechanisms described below.

Figure 4:
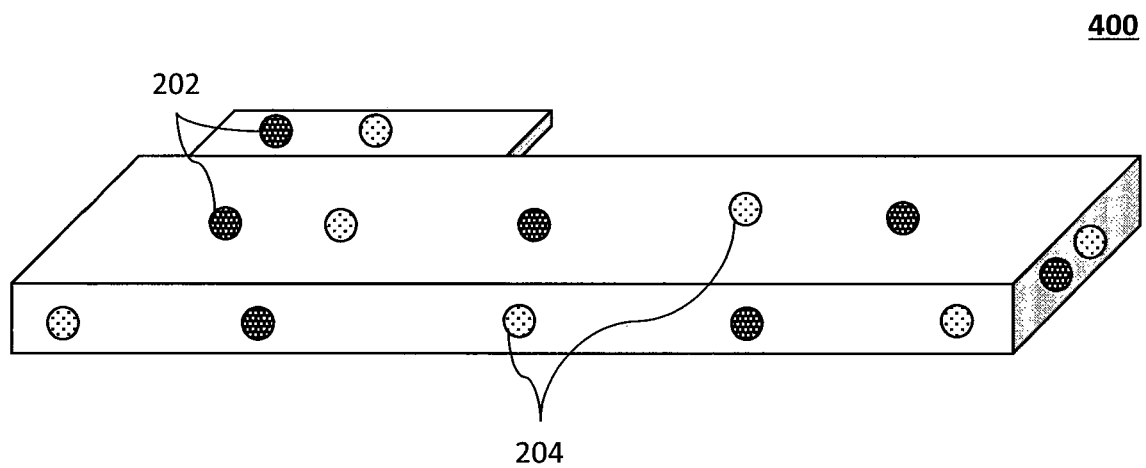
FIG. 4 shows an example mold equipped with sensors and motion capture markers according to an aspect of the present disclosure.

In some examples, such as shown in FIG. 4, markers 204 and/or sensors 202 may also be placed in and/or on a mold 400 used in the manufacturing process. In some examples, the markers 204 on the mold 400 may be passive markers 204, such that no power source 302 is needed. In some examples, the markers 204 may be active or hybrid, with a power source 302 and/or other corollary equipment 300 in electrical communication with the mold 400 attached to the mold 400 and/or to a workbench 106 or other structure used during the manufacturing process. The sensors 202 may be any of the sensors 202 previously discussed.

Figure 5:
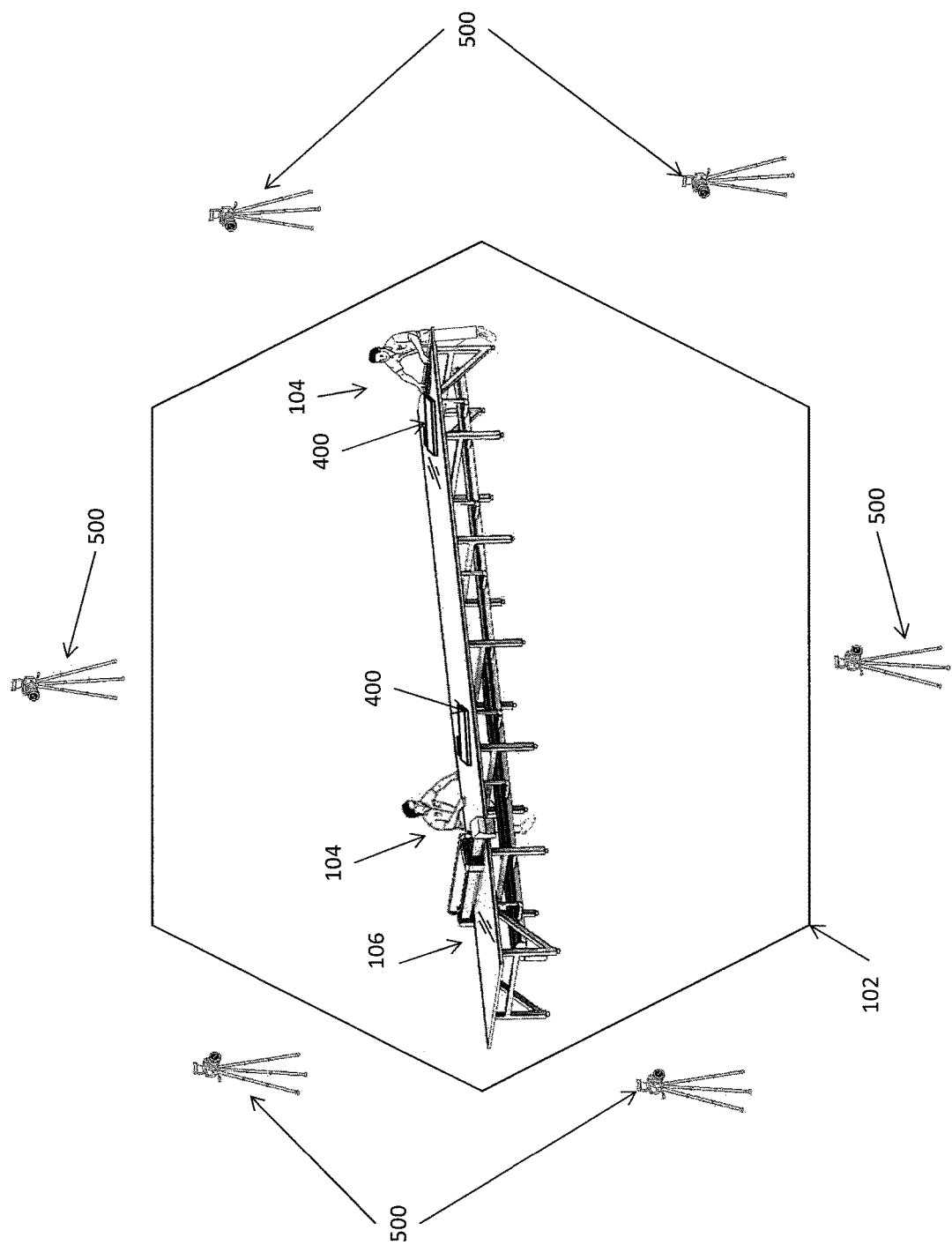
FIG. 5 shows a diagram illustrating example motion capture cameras ringing an example manufacturing workspace according to an aspect of the present disclosure.

FIG. 5 illustrates a workspace 102 within which, for example, a hand layup portion of the composite manufacturing process might take place. The workspace 102 may also comprise a motion capture environment. In some examples, a workbench 106 (and/or table, platform, etc.) is positioned within the workspace 102. While a single workbench 106 may be shown and/or discussed, in some examples, multiple workbenches 106 may be used. Technicians 104 may use the workbench to complete all or some of the composite manufacturing process. In some examples, markers 204 may be affixed to various portions of the workbench 106, with corollary equipment 300 attached to the markers 204 and/or in electrical communication with the markers 204 as necessary. In some examples, technicians 104 working within the workspace 102 may be wearing one or more gloves 200 with corollary equipment 300 in/on the gloves and/or otherwise attached to the technicians 104. In some examples, the technicians 104 may be using one or more molds 400 with attached markers 204 and/or sensors 202 to complete the composite manufacturing process.

In some examples, the workspace 102 may be surrounded by a plurality of motion capture cameras 500 having lenses directed towards the workspace 102. The motion capture cameras 500 may be configured to capture positions and/or motions of the technicians 104, molds 400, and/or workbench 106 within the workspace 102. In some examples, some or all of the motion capture cameras 500 may be IR motion capture cameras. In some examples, some or all of the motion capture cameras 500 may be markerless cameras that rely on conventional vision sensing. While in the example of FIG. 5, the cameras 500 are shown surrounding the workspace 102, in some examples, the cameras 500 may only partially surround the workspace 102, such as with a semi-circular formation and/or triangular formation, where the cameras 500 have less than a fully three hundred and sixty degree coverage from all sides of the workspace 102. In some examples, all or some of the cameras 500 may be positioned on stands, as shown in the example of FIG. 5. In some examples, all or some of the cameras 500 may be mounted to walls, pillars, columns, and/or ceilings around the workspace 102, and/or to struts, beams, hangars, frames and/or other structures proximate the walls and/or ceilings around the workspace 102.

Figure 6:
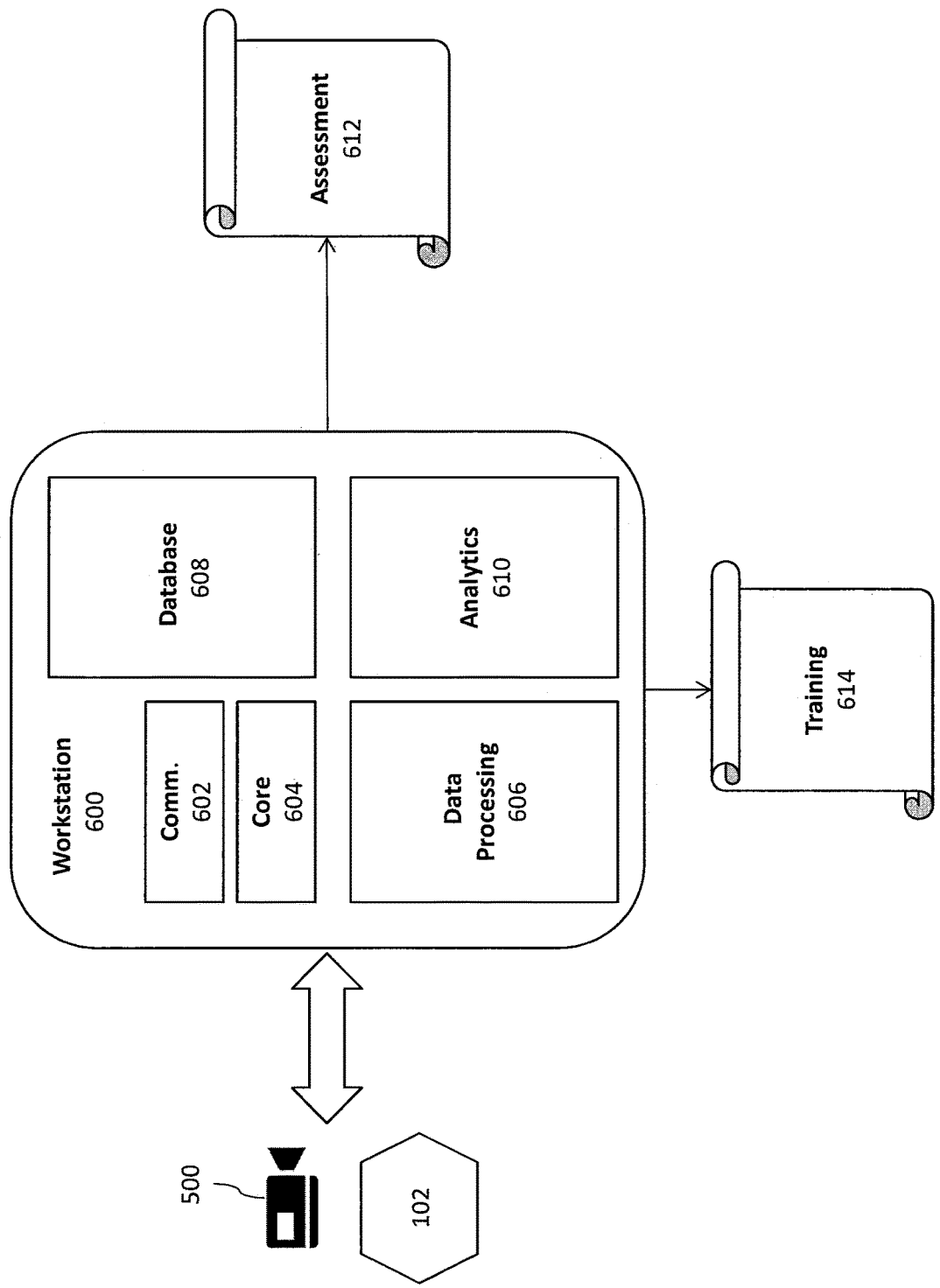
FIG. 6 shows a block diagram illustrating example functional components and connections of an example workstation according to an aspect of the present disclosure.

The cameras 500 may be operatively coupled with a remote workstation 600, and/or a communication device 602 of the remote workstation 600, such as shown in FIGS. 1 and 6, for example. The cameras 500 may be connected to the remote workstation 600 through physical cabling, lines, cords, wires, etc. and/or through wireless communication channels, such as discussed above. The cameras 500 may communicate motion and/or position data in the form of electrical signals to the remote workstation 600. The motion and/or position data may be based on the positions and/or change in positions of the markers 204 in the workspace 102 over a period of time. More particularly, the cameras 500 may use light (and/or radiation) given off and/or reflected by the markers 204 to facilitate tracking, detection, and/or measurement of position and/or change in position of the markers 204 (and/or the objects to which the markers 204 are attached) over a period of time. In some examples, the cameras 500 may transmit the motion and/or position data to the remote workstation 600 in real-time. In some examples, the cameras 500 may record the motion and/or position data in memory simultaneous with the transmission, and/or before transmission. Different cameras 500 may record and/or transmit different perspectives of the position and/or motion of the markers 204. The workstation 600 may combine data from all the cameras 500 to generate a three dimensional model of the workspace 102, and/or the position and/or motion of the technicians 104, gloves 200, workbench 106, mold 400, and/or work pieces within the workspace 102.

The workstation 600 may also receive information from the sensors 202 attached to the gloves 200, workbench 106, and/or mold 400. More particularly, a communication device 602 (e.g., a transceiver) of (and/or in communication with) the remote workstation 600 may receive signal transmissions over a wireless communication channel from the transceiver 314 of the controller 306 of the corollary equipment 300. The signal transmissions may encode data representative of measurements, readings, and/or outputs of the sensors 202. The measurements, readings, and/or outputs of the sensors 202 may be coordinated, facilitated by, and/or received by the corollary equipment 300, which may in turn send the data to the workstation 600 via the transceiver 314 and/or communication device 602.

In some examples, the workstation 600 may receive data from multiple workspaces 102 (e.g., sensors 202 within multiple workspaces 102 and/or cameras 500 directed at multiple workspaces 102. Further, while a single remote workstation 600 is generally referred to, the remote workstation 600 may comprise one or more actual computers, servers, laptops, desktops, tablets, memory banks, databases and/or other devices, such as, for example, in a local area network, wide area network, and/or other network. In some examples, the remote workstation 600 may comprise a core 604, a data processing engine 606, a database 608, and/or an analytics engine 610. In some examples, the core 604 may comprise the central functionality of the workstation 600, such as the operating system, central processing, and/or central functioning of the workstation 600. The core 604 may also coordinate and/or facilitate data intake and/or output from the cameras 500, sensors 202, and/or corollary equipment 300. In some examples, the core 604 may send instructions to the cameras 500 and/or sensors 202 (e.g., via the corollary equipment 300) in order to better facilitate and/or coordinate operation of the cameras 500 and/or sensors 202.

In some examples, the workstation 600 may comprise a data processing engine 606 to process data from the sensors 202 and/or cameras 500. In some examples, the data processing engine 606 may comprise software and/or hardware components configured to translate the raw data received from the sensors 202 and/or cameras 500 into information more easily used and/or parsed by other programs and/or parts of the workstation 600. In some examples, the data processing engine 606 may use the translated and/or raw data from the sensors 202 and/or cameras 500 to generate one or more models of the hand layup process (and/or other portions of the composite manufacturing process) taking place within the workspace 102 based on data from the sensors 202 and/or markers 204 attached to the gloves 200, molds 400, and/or workbench 106. In some examples, the data processing engine 606 may store raw and/or translated data from the sensors 202 and/or cameras 500 in a database 608.

In some examples, the database 608 may be partly or wholly implemented in a memory of the workstation 600. In some examples, the database 608 may be partly or wholly implemented in a memory of one or more remote and/or networked workstations 600. The database 608 may log, save, record, retain, and/or store real-time, recent, and/or historic data received by the workstation 600 from the sensors 202 and/or cameras 500. The data may be raw data received directly from the sensors 202 and/or cameras 500 and/or data processed by the processing engine 606. In some examples, the database may also log, save, record, retain, and/or store other data pertaining to the hand layup and/or composite manufacturing process. In some examples, the other data may be manually entered by an operator, technician, and/or other user, and/or obtained from other sensors, cameras, workstations, programs, systems, etc. For example, data pertaining to a quality of a (wholly or partially) finished composite work may be stored in the database 608 and/or correlated with sensor 202 and/or camera 500 data recorded during the composite manufacturing process. Thereafter, the quality data may be analyzed to determine what (good or bad) actions during the composite manufacturing process may have resulted in the (good or bad) quality of the composite work. In some examples, data pertaining to speed, timing, and/or efficiency may also be recorded and/or correlated with sensor 202 and/or camera 500 readings made during the composite manufacturing process. In some examples, the database 608 may log, save, record, retain, and/or store a sufficient amount of data over a broad enough spectrum of time for machine learning techniques and/or long term analysis to be effective in estimating ideal and/or "best practice" techniques, actions, movements, positions, and/or processes for technicians 104, molds 400, composite works, workbenches 106, etc. during the layup and/or composite manufacturing process.

In some examples, the workstation 600 may include an analytics engine 610. The analytics engine 610 may analyze data from the sensors 202 and/or cameras 500 to generate statistical analysis, quality assessments 612, and/or training regiments 614. In some examples, the data analyzed by the analytics engine 610 may be raw data from the sensors 202 and/or cameras, processed data from the data processing engine 606, data from the database 608, and/or other available data. In some examples, the analytics engine 610 may generate (and/or assist the data processing engine 606 in generating) one or more models of the composite work, the mold 400, the layup process and/or the composite manufacturing process taking place within the workspace 102. In some examples, the analytics engine 610 may analyze the models and generate statistical analysis, quality assessments 612, and/or training regimens 614 based on the model analysis. In some examples, the analytics engine may make use of machine learning techniques and/or long term analysis to generate statistical analysis, quality assessments 612, and/or training regimens 614. For examples, the analytics engine 610 may analyze recent and/or historical models, recent and/or historic sensor 202 and/or camera 500 data, and/or other data to estimate bad, normal, ideal and/or "best practice" techniques, actions, movements, positions, and/or processes for technicians 104, molds 400, composite works, workbenches 106, etc. during the layup and/or composite manufacturing process. These estimations may be used to assess a recent and/or current layup and/or composite manufacturing process.

In some examples, the analytics engine 610 may generate assessment 612 output based on comparisons between the estimated bad, normal, ideal, and/or "best practice" layup and/or composite manufacturing process and the recent and/or current layup and/or composite manufacturing process. The comparisons may allow the analytics engine 610 to assess a likelihood that the recent and/or current process will develop a high and/or low quality composite work, and/or a composite work with one or more defects. In some examples, feedback may be generated in real-time based on an analysis of the current layup and/or composite manufacturing process as compared to the estimated bad, normal, ideal, and/or "best practice" layup and/or composite manufacturing process. For examples, the gloves 200 and/or corollary equipment may include haptic feedback devices (such as through the UI 304, for example) configured to vibrate to alert a technician when the measured manipulations appear to be outside what has been assessed as a normal and/or good range. In some examples, audio and/or visual feedback may be provided through the UI 304 of the corollary equipment to alert the technician as to an assessment of their quality of operation.

In some examples, the analytics engine may generate training regimen 614 outputs based on an identification of sensor 202 and/or camera 500 data (such as sensor 202 and/or camera 500 data of certain models) correlated with good and/or high quality composite works. In some examples, the training regimen 614 output may be in the form of written instructions and/or guidelines for human technicians 104 to consider and/or follow. In some examples, the training regimen 614 output may be in the form of feedback to technicians 104, as described above. In some examples, the training regimen 614 output may be in the form of suggested specifications and/or criteria for design and/or implementation of an automated layup and/or composite manufacturing system. In some examples, the training regimen 614 output may be in the form of actual computer code, instructions, compilers, application programming interfaces (APIs), and/or suggested specifications and/or criteria for design and/or implementation of computer code, instructions, compilers, application programming interfaces (APIs).

Figure 7:
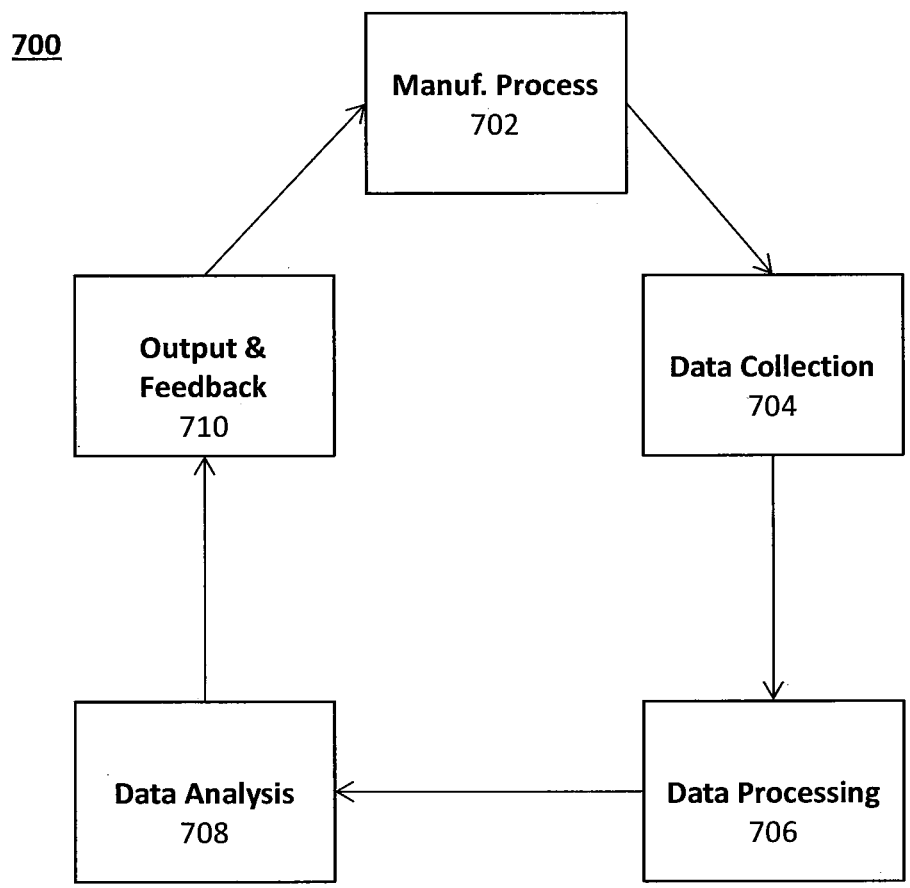
FIG. 7 shows a flow diagram illustrating an example method according to an aspect of the present disclosure.

FIG. 7 illustrates an example method of operation 700, in accordance with aspects of the present disclosure. At step 702 of the method of operation 700, technicians 104 in the workspace 102 perform the layup process and/or other manufacturing processes (such as composite manufacturing processes, for example). In some examples, the technicians 104 may be wearing gloves 200 fitted with markers 204 and/or sensors 202. In some examples, the technicians 104 may be using molds 400 on which markers 204 and/or sensors 202 are attached. In some examples, one or more workbenches 106 in the work area may have markers 204 attached as well. During step 704, the sensors 202 collect data and transmit the data to the remote workstation 600 as discussed above. The cameras 500 also collect position and/or motion data pertaining to activities in the workspace 102 and transmit the data to the remote workstation 600. During step 706, data is processed by the data processing engine 606 of the workstation 600. In some examples data may also be wholly and/or partially processed by the converter 312 of the controller 306 of the corollary equipment 300 (in step 704 and/or 706). The data processing engine 606 may store raw and/or processed data in the database 608 of the workstation 600. The data processing engine 606 may generate one or more models based on the sensor 202 and/or camera 500 data. The models may also be stored in the database 608. In some examples, the analytics engine 610 may assist with or wholly takeover model generation. At step 708, the data analytics engine 610 analyzes the raw and/or processed sensor 202 and/or camera 500 data. The analytics engine 610 may further analyze historical data stored in the database 608, as well as current and/or historical models. At step 710, the analytics engine 610 may generate statistical analysis, assessments 612, and/or training regimen 614 outputs. In some examples, the assessments 612 and/or training regimen 614 outputs may be used to provide real-time and/or later in time feedback to the technicians 104. In some examples, the training regimen 614 may be used to train new technicians 104 and/or construct and/or train an automated system to perform the manufacturing process.

It can be appreciated that aspects of the present disclosure may be implemented by hardware, software and/or a combination thereof. The software may be stored in a non-transitory machine-readable (e.g., computer-readable) storage medium, for example, an erasable or re-writable Read Only Memory (ROM), a memory, for example, a Random Access Memory (RAM, a memory chip, a memory device, or a memory Integrated Circuit (IC), or an optically or magnetically recordable non-transitory machine-readable, e.g., computer-readable, storage medium, e.g., a Compact Disk (CD), a Digital Versatile Disk (DVD), a magnetic disk, or a magnetic tape.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A system for monitoring a user during a manufacturing process, the system comprising:
   a glove that is sized and shaped to be worn on a hand of the user during the manufacturing process;
   a force sensor coupled to the glove and configured to measure a force imparted on the glove during the manufacturing process;
   a motion capture marker coupled to the glove and configured to provide a beacon for a motion capture camera to track during the manufacturing process; and
   a remote workstation operatively coupled with the force sensor and the motion capture camera, wherein the remote workstation is configured to
      track, via the motion capture camera, a motion of the user during the manufacturing process,
      process, via a processor, force data from the force sensor and motion data from the motion capture cameras, and
      performing an analysis of the force data and position data and generate an output based on the analysis,
      wherein the output comprises a manufacturing quality assessment.

2. The system of claim 1, wherein the force sensor is a force sensitive resistor.

3. The system of claim 1, wherein the force sensor comprises a plurality of force sensors, each of said plurality of force sensors positioned at a different fingertip of the glove.

4. The system of claim 1, wherein the motion capture marker comprises a plurality of motion capture markers positioned proximate knuckle portions of the glove.

5. The system of claim 1, wherein the force sensor is in communication with corollary equipment.

6. The system of claim 5, wherein the corollary equipment comprises a controller, a transceiver, and a power source.

7. The system of claim 6, wherein the corollary equipment is attached to the glove.

8. The system of claim 6, wherein the transceiver is configured to send data representative of the force measured by the force sensor to the remote workstation.

9. A method for monitoring a technician during a manufacturing process via a glove equipped with a plurality of force sensors and a plurality of motion capture markers, the method comprising:
   measuring, via the plurality of force sensors, a force imparted upon the glove during the manufacturing process;
   tracking, via one or more motion capture cameras, a motion of the technician during the manufacturing process, wherein the one or more motion capture cameras are configured to track the motion via the plurality of motion capture markers positioned on the glove;

transmitting force data measured by the plurality of force sensors and motion data tracked by the motion capture cameras to a workstation;

processing, via a processor, the force data and motion data;

storing the force data and motion data in a database;

performing an analysis of the data;

wherein the analysis comprises assessing a quality associated with the manufacturing process based at least in part on prior force data and motion data stored in the database; and providing an output based on the analysis.

10. The method of claim 9, wherein the processing comprises generating a model based on the force data and motion data and storing the model in the database.

11. The method of claim 9, further comprising identifying a composite work with one or more defects based at least in part on the output.

12. The method of claim 11, wherein the analysis comprises assessing the quality based at least in part on prior models stored in the database.

13. The method of claim 9, wherein the output further comprises training information to train a robot to automate one or more portions of the composite layup manufacturing.

14. A system for monitoring a user during a process, the system comprising:

a glove having a force sensor configured to measure a force on the glove during composite manufacturing and a motion capture marker configured to provide a beacon for a first camera to track during composite manufacturing;

the first camera configured to track a position or a change in position of the glove as a function of a position or change in position of the motion capture marker during manufacturing;

a transmitter configured to transmit force data, wherein the force data is representative of the force measured by the force sensor during manufacturing;

a receiver configured to receive the force data;

a database configured to store force data representative of the force measured by the force sensor and position data representative of the position or change in position tracked by the camera; and an analytics engine configured to perform an analysis of the force data and position data and generate an output based on the analysis.

15. The system of claim 14, wherein the force sensor is one of a plurality of force sensors, and wherein each of the plurality of force sensors is positioned at a fingertip of the glove.

16. The system of claim 14, wherein the motion capture marker comprises a plurality of motion capture markers, wherein each motion capture marker is an IR motion capture marker.

17. The system of claim 14, wherein the motion capture markers are positioned proximate knuckle portions of the glove.

18. The system of claim 14, wherein the first camera is directed at a composite manufacturing workspace, wherein the first camera is configured to track a position of the motion capture marker in the composite manufacturing workspace.

19. The system of claim 14, further including a second camera configured to track position of the user in a composite manufacturing workspace using computer vision methods.

20. The system of claim 14, wherein the output of the analytics engine comprises an assessment of quality of a composite work resulting from the process.

* * * * *